United States Patent
Tourapis et al.

(10) Patent No.: US 8,428,135 B2
(45) Date of Patent: Apr. 23, 2013

(54) DEVICE AND METHOD FOR FAST SUB SAMPLE BLOCK-MATCHING MOTION ESTIMATION IN VIDEO ENCODERS

(75) Inventors: Alexandros Tourapis, Burbank, CA (US); Pankaj N. Topiwala, Clarksville, MD (US)

(73) Assignee: FastVDO, LLC, Columbia, MD (US)

( * ) Notice: Subject to any disclaimer, the term of this patent is extended or adjusted under 35 U.S.C. 154(b) by 1742 days.

(21) Appl. No.: 11/598,976

(22) Filed: Nov. 14, 2006

(65) Prior Publication Data

US 2007/0127577 A1 Jun. 7, 2007

Related U.S. Application Data

(60) Provisional application No. 60/736,583, filed on Nov. 14, 2005.

(51) Int. Cl.
| | |
|---|---|
| *H04N 7/50* | (2006.01) |
| *H04N 7/36* | (2006.01) |
| *H04N 7/34* | (2006.01) |

(52) U.S. Cl.
USPC .............. 375/240.16; 375/240.14; 375/240.17

(58) Field of Classification Search .............. 375/240.12, 375/240.16, 240.17
See application file for complete search history.

(56) References Cited

U.S. PATENT DOCUMENTS

| | | | | |
|---|---|---|---|---|
| 2003/0161400 | A1* | 8/2003 | Dinerstein et al. | 375/240.16 |
| 2004/0252766 | A1* | 12/2004 | Lee et al. | 375/240.17 |
| 2006/0245497 | A1* | 11/2006 | Tourapis et al. | 375/240.16 |

OTHER PUBLICATIONS

P. Yin, H. Y. C. Tourapis, A.M. Tourapis, & J. Boyce, "Fast Motion Decision and Motion estimation for JVT/H.264", 3 Proc. 2003 Int'l Conf. on Image Processing (ICIP 2003) 853--56 (Sep. 2003).*

A.M. Tourapis, "Enhanced predictive zonal search for single and multiple frame motion estimation", 4671 Proc. SPIE 1069 (Jan. 7, 2002).*

Tourapis, A.M., et al., "Fast ME in the JM reference software", ISO/IEC JTC1/SC29/WG11 and ITU-T SG16 Q.6, doc. JVT-P026, 16th Meeting, Poznan, Poland, Jul. 24-29, 2005.

Cheong, H.Y., et al., "Fast Motion Estimation within the JVT codec", ISO/IEC JTC1/SC29/WG11 and ITU-T SG16 Q.6, doc. JVT-E023, 5th Meeting, Geneva, Switzerland, Oct. 9-17, 2002.

Tourapis, A.M., et al., "Highly efficient predictive zonal algorithms for fast block-matching motion estimation," IEEE Transactions on Circuits and Systems for Video Technology, vol. 12, No. 10, Oct. 2002, pp. 934-947.

Chen, Z., et al., "Fast Integer Pel and Fractional Pel Motion Estimation for JVT", ISO/IEC JTC1/SC29/WB11 and ITU-T SG 16 Q.6; doc. JVT-F017, 6th Meeting, Awaji Island, Japan, Dec. 5-13, 2002.

Yi, X., et al., "Improved and simplified fast motion estimation for JM", ISO/IEC JTC1/SC29/WG11 and ITU-T SG16 Q.6, doc. JVT-P021, 16th Meeting, Poznan, Poland, Jul. 24-29, 2005.

* cited by examiner

*Primary Examiner* — David Czekaj
*Assistant Examiner* — David N Werner
(74) *Attorney, Agent, or Firm* — Dickstein Shapiro LLP

(57) ABSTRACT

Methods of using motion estimation techniques with video encoders to provide significant data compression with respect to video signals so that the video signals may subsequently be reconstructed with minimal observable information loss. Methods include a fast fractional motion estimation scheme.

28 Claims, 3 Drawing Sheets

DEVICE AND METHOD FOR FAST SUB SAMPLE BLOCK-MATCHING MOTION ESTIMATION IN VIDEO ENCODERS

CROSS REFERENCE TO RELATED APPLICATIONS

This application claims benefit of priority from U.S. Provisional Patent Application No. 60/736,583, filed Nov. 14, 2005.

FIELD OF THE INVENTION

The invention relates to the compression of images for storage or transmission and for subsequent reconstruction of an approximation of the original image. More particularly, it relates to the coding of video signals for compression and subsequent reconstruction. Most particularly, it relates to the use of the technique of motion estimation as a means of providing significant data compression with respect to video signals so that they may subsequently be reconstructed with minimal observable information loss.
Keywords: Fast Motion Estimation, Fractional Sample Motion Estimation, Video Encoding Block Based Motion Estimation, Predictive Search, H.264, MPEG

BACKGROUND OF THE INVENTION

Motion Estimation is one of the most computationally complex processes within a video encoding system. This is especially true for an ITU-T H.264/ISO MPEG-4 AVC based encoder considering that motion estimation may need to be performed using multiple references or block sizes. With the extension and usage however of the H.264 standard into higher resolutions and formats, encoding speed has become even more vital.

The basic idea of motion estimation is to look for portions of a "current" frame (during the process of coding a stream of digital video frames for transmission and the like) that are the same or nearly the same as portions of previous frames, albeit, in different positions on the frame because the subject of the frame has moved. If such a block of basically redundant pixels is found in a preceding frame, the system need only transmit a code that tells the reconstruction end of the system where to find the needed pixels in a previously received frame.

Thus motion estimation is the task of finding predictive blocks of image samples (pixels) within references images (reference frames, or just references) that best match a similar-sized block of samples (pixels) in the current image (frame). It is a key component of video coding technologies, and is one of the most computationally complex processes within a video encoding system. It is therefore highly desirable to consider fast motion estimation strategies so as to reduce encoding complexity while simultaneously having minimal impact on compression efficiency and quality.

In A. M. Tourapis, H. Y. Cheong, and P. Topiwala, "Fast ME in the JM reference software," ISO/IEC JTC1/SC29/WG11 and ITU-T Q6/SG16, document JVT-P026, July '05, an extension of predictive based fast motion estimation algorithms was presented and named as the Enhanced Predictive Zonal Search schemes, which were later adopted and implemented into the JM reference software. Although the EPZS scheme can easily be extended to simultaneously consider fractional samples, the original implementation only considered integer samples. Nevertheless, and without adapting the original EPZS implementation to subpel positions but considering that subpixel motion estimation becomes the biggest bottleneck after the introduction of this scheme, a simple yet efficient fractional sample fast motion estimation scheme is introduced herein.

SUMMARY OF THE INVENTION

Motion estimation is the science of extracting redundancies in a video sequence that occur between individual frames. Given a current frame, say number n, the system divides it into a set of rectangular blocks, for example into identical blocks of size 16×16 pixels. For each such block, the system of this invention searches within the previous frame n−1 (or more generally, we search within a series of previous frames, referred to herein as references frames), to see where (if at all) it best fits, using certain measures of goodness of fit.

Motion estimation is one of the most computationally complex processes within a video encoding system. This is especially true for an ITU-T H.264/ISO MPEG-4 AVC based encoder considering that motion estimation may need to be performed using multiple references or block sizes. For this purpose, several Fast Integer Sample Motion Estimation schemes are introduced to reduce complexity of considering integer positions during motion estimation. However, after making such considerations, fractional sample motion vector refinement becomes instead the greatest bottleneck for video encoding. Therefore algorithms that can reduce such complexity, with little impact in quality, are required.

DETAILED DESCRIPTION OF THE PREFERRED EMBODIMENTS

Figure 1A:
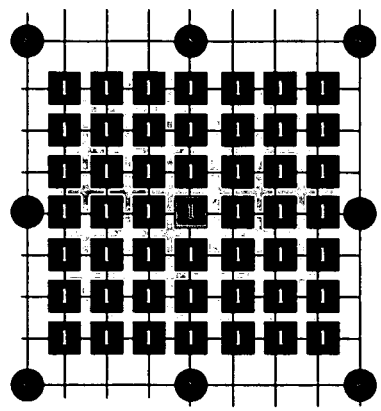
FIG. 1A illustrates a Brute Force Fractional Motion Estimation around current best integer position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

In most video encoders, the integer and fractional motion estimation processes are performed separately using different strategies. There are several schemes proposed for Fast Integer sample motion estimation such as the Predictive Motion Estimation schemes used in H. Y. Cheong, A. M. Tourapis, and P. Topiwala, "Fast Motion Estimation within the JVT codec," ISO/IEC JTC1/SC29/WG11 and ITU-T Q6/SG16, document JVT-E023, October 2002, A. M. Tourapis, H. Y. Cheong, and P. Topiwala, "Fast ME in the JM reference software," ISO/IEC JTC1/SC29/WG11 and ITU-T Q6/SG16, document JVT-P026, July 2005, and A. M. Tourapis, O. C. Au, and M. L. Liou, "Highly efficient predictive zonal algorithms for fast block-matching motion estimation," IEEE Transactions on Circuits and Systems for Video Technology, Vol. 12, Iss. 10, pp. 934-47, October 2002. However, with the introduction of these schemes the most significant burden in terms of complexity on a video encoder is shifted onto the fractional sample motion estimation engine.

This is especially true if a brute force approach is considered where one may wish to check all possible subpixel positions around a best integer sample match. An exemplary depiction is presented in FIG. 1a. In such a case, one would have to examine up to 80+1 positions (1 additional if for various reasons the integer sample position needs to be recomputed) which can in fact be considerably higher than the average total number of integer sample positions that schemes that the literature referenced above may consider. In fact, the schemes in A. M. Tourapis, O. C. Au, and M. L. Liou's, "Highly efficient predictive zonal algorithms for fast block-matching motion estimation," IEEE Transactions on Circuits and Systems for Video Technology, Vol. 12, Iss. 10, pp. 934-47, October 2002, claimed that on average 5-7 points only needed to be tested. Furthermore, it is possible that in some implementations, more complicated distortion metrics are used during the computation of the fractional position distortion, such as distortion with Hadamard transform consideration.

More specifically, in most cases distortion is computed simply as the SAD (Sum of Absolute Differences):

$$SAD(s, c(m)) = \sum_{x=1,y=1}^{B_i,B_j} |s[x,y] - c[x-m_x, y-m_y]|, \quad (1)$$

where $B_i$ and $B_j$ correspond to the current block width and height respectively which in the case of an H.264 encoder can take values of 16, 8, and 4, with s being the original video signal and c being the coded video signal, and $m_x$ and $m_y$ correspond to the motion vector currently being tested. Instead, we may wish to first compute the difference block D with elements:

$$D_{c(m)}[x,y] = s[x,y] - c[x-m_x, y-m_y], \quad (2)$$

transform the signal to a new signal $T_{c(m)} = f(D_{c(m)})$ and then compute distortion as:

$$SATD(s, c(m)) = \sum_{x=1,y=1}^{B_i,B_j} |T_{c(m)}[i,j]|, \quad (3)$$

For the Hadamard case if the 4×4 transform is to be used, then each 4×4 sub-partition of a block is transformed by:

$$T_{c(m)} = H \cdot D_{c(m)} \cdot H^T,$$

with $$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

This transformation process adds further burden in the encoding process when considering fractional sample positions.

Figure 1B:
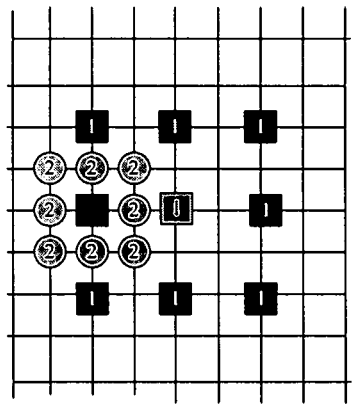
FIG. 1B is an illustration of a 2-step fractional motion estimation.

As a compromise, many encoders such as the H.264 JM reference software set forth in JVT reference software version JM10.1, consider a two step approach where one first only considers all half pixel samples, and then in a second step performs a refinement only around the best half pixel sample, as referenced in FIG. 1B. Using this approach, only 16 (17 if the center is reexamined) samples need to be considered. However, several other schemes, such as those disclosed in Z. Chen, P. Zhou, and Y. He, "Fast Integer and Fractional Pel Motion Estimation for JVT," JVT-F017r.doc, Joint Video Team (JVT) of ISO/IEC MPEG & ITU-T VCEG. 6th Meeting, Awaji, Island, Japan, Dec. 5-13, 2002., X. Yi, J. Zhang, N. Ling, and W. Shang, "Improved and simplified fast motion estimation for JM", ISO/IEC JTC1/SC29/WG11 and ITU-T Q6/SG16, document JVT-P021, July 2005., and P Yin, H. Y. Cheong, A. M. Tourapis, and J. Boyce, "Fast Mode decision and motion estimation for JVT/H.264", in Proceedings of the 2003 IEEE International Conference in Image Processing (ICIP 2003), Volume 3, pp 853-6, September 03, have been proposed which consider various techniques to further speed up the fractional sample motion estimation process.

A common approach, as set forth in "Fast Integer and Fractional Pel Motion Estimation for JVT" and "Improved and simplified fast motion estimation for JM", is to consider a diamond based gradient descent scheme, such as that illustrated in FIG. 1B, with the optional consideration of early termination criteria during the search. In "Fast mode decision and motion estimation for JVT/H.264", the authors proposed examining each fractional level (½ and ¼) in a two level approach. First the 2 vertical and 2 horizontal positions at a given resolution are tested compared to the center location. If the best is not found in the center location, then the two adjacent remaining locations of the same resolution are also tested, and then refinement is performed at the next resolution level. Otherwise, if the best is found at the center then no other location at this resolution is tested and refinement at the next is immediately performed. In this particular case, one may test a maximum of 6+6 (7+6 if the center is retested) locations.

Finally, the authors also proposed an alternative scheme that considers that the error surface is very likely to be monotonic, and therefore only tests locations between the best and second best position of a certain refinement level.

Figure 2A:
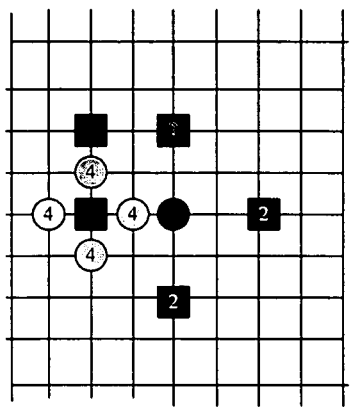
FIG. 2A is an example of subpixel refinement using the proposed scheme.
Figure 2B:
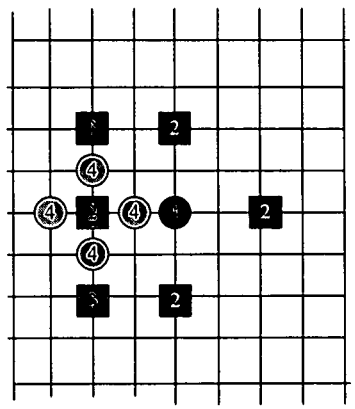
FIG. 2B is an additional example of subpixel refinement using the proposed scheme.
Figure 2C:
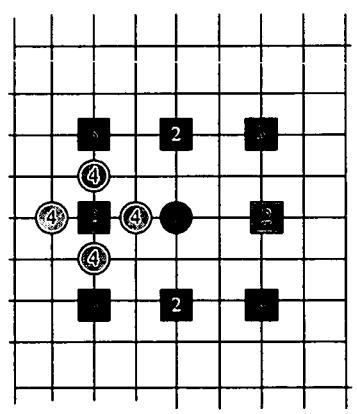
FIG. 2C is another example of subpixel refinement using the proposed scheme.

The present invention presents an alternative fast fractional sample motion estimation scheme to the ones in the above-referenced literature. More specifically, our fast fractional motion estimation scheme, similar to the schemes presented in "Fast mode decision and motion estimation for JVT/H.264", assumes that fractional positions aligned on the vertical or horizontal axis (i.e. diamond positions 2 in FIG. 1a) have higher probability to be the minimum locations. FIGS. 1A, 2B, and 2C present examples of subpixel refinement using the proposed scheme. In FIG. 2A, the best and second best are adjacent non zero positions, and therefore a single position is additionally tested for refinement. In FIG. 2B, the best or second best is the center location, and in this case 2 additional points may be tested. Finally, in FIG. 2C, the best and second best are on opposite locations which suggest that information is not sufficient and all remaining subpixel positions for the current fractional refinement should be tested.

However, unlike the scheme in "Fast mode decision and motion estimation for JVT/H.264", additional decisions are made in terms of which location to examine next depending on the relationship of the best and second best location but also the minimum distortion as computed at a given point. More specifically, cases that are considered are as follows:
a) Best location is the center of the center,
b) Second best is at the center
c) Best and Second Best are adjacent locations
d) Best and Second Best are opposite locations.

The inventive algorithm is set forth as follows:
Assume that current best MV is equal to MV=$\{mv_x, mv_y\}$ and predictor mv is PMV=$\{pmv_x, pmv_y\}$ Step 1: Set diamond patterns DPhalf=$\{(0,0)\ (-2,0),\ (0,2),\ (2,0),\ (0,-2)\}$ and DPqpel=$\{(0,0)\ (-1,0),\ (0,1),\ (1,0),\ (0,-1)\}$. Set DP=DPhalf. Set resolution to ½.

Step 2: Examine all positions $DP_i$(i=0 . . . 4) around the current best location. Store both current best and second best locations (best_pos and second_pos respectively) and their respective distortion values (min_sad and second_sad).

Step 3: If (best_pos==0), (MV==PMV), and (min_sad<T), where T is a threshold, terminate search.

Step 4: If (MV==PMV), goto step 6.

Figure 1C:
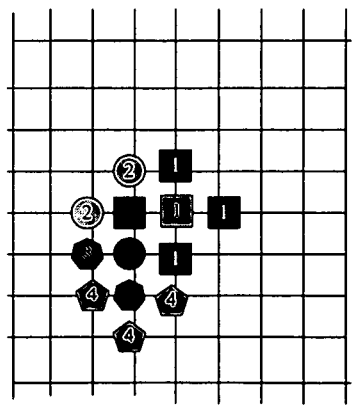
FIG. 1C is a depiction of a diamond based gradient descent fractional motion estimation.

Step 5: Depending on the location of best_pos and second_pos determine which additional points to examine at current resolution as follows:
If (best_pos==0)||(second_pos==0), examine the two additional points of the same resolution adjacent to the non zero location (FIG. 1b). Update appropriately best_pos.
Otherwise, if (best_pos^second_pos), i.e. positions are neighboring, further examine the additional remaining position between the two samples (FIG. 1a). Update appropriately best_pos.
Otherwise, if best_pos and second are on opposite directions, examine all remaining points in current resolution (FIG. 1c). Update appropriately best_pos.

Step 6: Update best MV as MV+DPbest_pos

Step 7: If (resolution==¼) terminate. Otherwise set DP=DPqpel. Set resolution to ¼. Go to Step 2.

Figure 3:
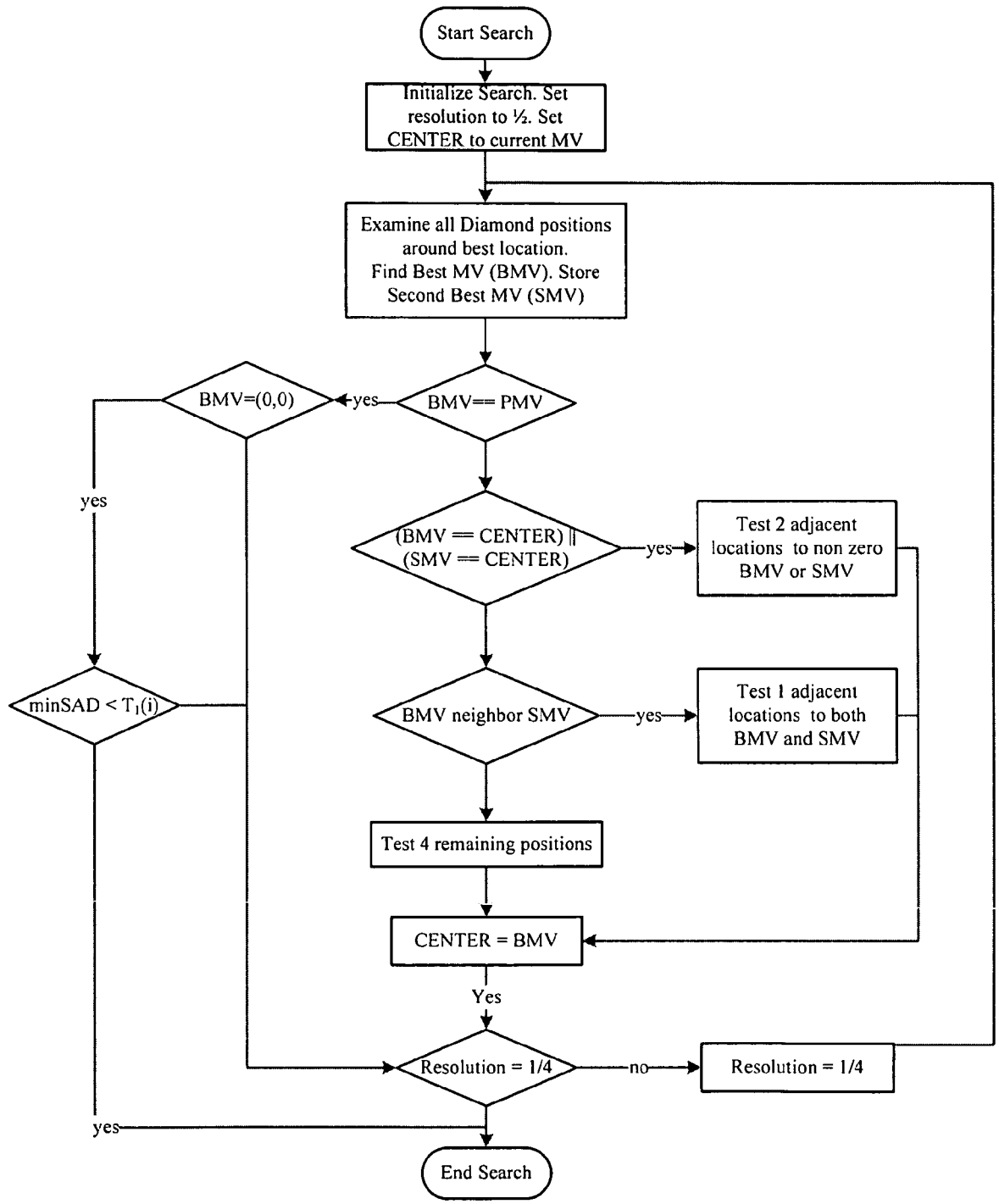
FIG. 3 is a flowchart of the Proposed Fast Fractional Motion Estimation Scheme.

A flowchart of the proposed scheme is presented in FIG. 3. The scheme set forth herein may be extended to any fractional sample resolution (i.e. $⅛^{th}$, $1/16^{th}$ etc, by repeating steps 2 through 6 for each resolution. It should be noted that the threshold used in step 3 may be fixed or even adaptive. Adaptation could be made based on block type and reference, but also through the consideration of the distortion of neighboring partitions previously examined.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method of using a video encoder for selecting the best matching block in a reference frame of a video, matching a block in a current frame of the video, according to a given distortion metric, the method comprising repeating the following steps for each of a one or more examination resolutions:
a) Setting an examination resolution;
b) Setting a center position as a current best location;
c) Examining a plurality of diamond positions around said center position a best location;
d) Finding a best motion vector;
e) Storing a second best motion vector;
f) Testing a set of conditions involving the best motion vector, a predictor motion vector, the center position, and also testing an early termination criterion;
i) If all said set of conditions are met and an early termination criterion is met, exiting and declaring a best motion vector;
ii) If said set of conditions are not met, proceeding to step (g);
g) Testing a plurality of positions and conditions, wherein said testing includes comparisons relating to the best motion vector, the second best motion vector, the center position, and the predictor motion vector;
h) Determining a new best motion vector;
i) Resetting the center position to be said new best motion vector;
j) Testing the examination resolution relative to a maximum resolution; and
k) Increasing the examination resolution if the examination resolution is less than the maximum resolution, and returning to step (c).

2. The method of claim 1, wherein the examination resolution is initially set to ½ pixel accuracy.

3. The method of claim 1, wherein the maximum resolution is ¼ pixel accuracy.

4. The method of claim 1, wherein the set of conditions of step (f) include the best motion vector matching both the predictor motion vector and the center position.

5. The method of claim 1, wherein the early termination criterion is that a distortion value for the best motion vector is less than the given distortion metric.

6. The method of claim 1, wherein the step of testing a plurality of positions and conditions further comprises testing two additional positions if either said best motion vector or said second best motion vector matches the center position, as determined using a logical OR operator.

7. The method of claim 6, wherein said two additional locations to be tested are adjacent to either said best motion vector if said best motion vector does not match the center position, or to said second best motion vector if said best motion vector does match the center position.

8. The method of claim 1, wherein the step of testing a plurality of positions and conditions further comprises testing one additional position if neither of said best motion vector or said second best motion vector matches the center position, and if said best motion vector and said second best motion vector are adjacent to each other.

9. The method of claim 8, wherein said one additional location to be tested is between said best motion vector and said second best motion vector.

10. The method of claim 1, wherein the step of testing a plurality of positions and conditions further comprises testing all remaining positions at the examination resolution if said best motion vector and said second best motion vector are in opposite directions.

11. The method of claim 1, wherein the given distortion metric used is chosen from the group: Sum of Absolute Differences (SAD), Sum of Absolute Value of Transformed Differences (SAID), and Mean Squared Error (MSE) or its equivalent Sum of Squared Differences (SSD).

12. A method of using a video encoder for selecting the best matching block in a reference frame of a video, matching a block in a current frame of the video, according to a given distortion metric, the method comprising repeating the following steps for each of a one or more examination resolutions:
a) Setting an examination resolution;
b) Setting a center position as current best location;
c) Examining a plurality of diamond positions around said center position;
d) Finding a best motion vector;

e) Storing a second best motion vector;
f) Testing a set of conditions involving the best motion vector, a predictor motion vector, and the center position;
  i) If said conditions are met, testing an early termination criterion;
    (1) If the early termination criterion is met, exiting and declaring a best motion vector;
    (2) If the early termination criterion is not met, proceeding to step (j);
  ii) If said conditions are not met, going to step (g);
g) Testing a plurality of positions and conditions, wherein said testing includes conditions relating to the best motion vector, the second best motion vector, the center position, and the predictor motion vector;
h) Determining a new best motion vector;
i) Resetting the center position to be said new best motion vector;
j) Testing the resolution of the examination resolution relative to a maximum resolution;
k) Increasing the examination resolution if the examination resolution is less than a maximum resolution, and returning to step (c).

13. The method of claim 12, wherein the set of conditions of step (f) include the best motion vector matching both the predictor motion vector and the center position.

14. The method of claim 12, wherein the early termination criterion is that a distortion value of said best motion vector is less than the given distortion metric.

15. The method of claim 12, wherein the step of testing a plurality of positions and conditions further comprises testing two additional positions if either said best motion vector or said second best motion vector matches the center position, as determined using a logical OR operator.

16. The method of claim 15, wherein said two additional locations to be tested are adjacent to either said best motion vector if said best motion vector does not match the center position, or to said second best motion vector if said best motion vector does match the center position.

17. The method of claim 12, wherein the step of testing a plurality of positions and conditions further comprises testing one additional position if neither of said best motion vector or said second best motion vector matches the center position, and if said best motion vector and said second best motion vector are adjacent to each other.

18. The method of claim 17, wherein said one additional location to be tested is between said best motion vector and said second best motion vector.

19. The method of claim 12, wherein the step of testing a plurality of positions and conditions further comprises testing all remaining positions at the examination resolution if said best motion vector and said second best motion vector are in opposite directions.

20. The method of claim 12, wherein the given distortion metric used is chosen from the group: Sum of Absolute Differences (SAD), Sum of Absolute Value of Transformed Differences (SATD), and Mean Squared Error (MSE) or its equivalent Sum of Squared Differences (SSD).

21. A method of using a video encoder for selecting the best matching block in a reference frame of an image, matching a block in a current frame of the image, according to a given distortion metric, the method comprising repeating the following steps for each of a one or more examination resolutions:
  a) Setting an examination resolution;
  b) Setting a center position as current best location;
  c) Examining a plurality of diamond positions around said center position;
  d) Finding a best motion vector;
  e) Storing a second best motion vector;
  f) Testing if the best motion vector matches a predictor motion vector;
    i) If the best motion vector does match the predictor motion vector, testing if the best motion vector also matches the center position;
    ii) If either the best motion vector does not match the predictor motion vector or does not match the center position, testing a plurality of positions and conditions, wherein said testing includes comparisons relating to the best motion vector, the second best motion vector, the center position, and the predictor motion vector;
      (1) Determining a new best motion vector;
      (2) Resetting the center position to the new best motion vector;
      (3) Testing if the examination resolution is a maximum resolution;
        (a) If the current examination resolution is the maximum resolution, exiting the search and declaring a best motion vector;
        (b) if the current examination resolution is not the maximum resolution, increasing the resolution;
      (4) Returning to step (c);
    iii) If the best motion vector matches the predictor motion vector and matches the center position, testing an early termination criterion based on a given threshold of the distortion metric;
      (1) If the early termination criterion is met, exiting and declaring a best motion vector;
      (2) If the early termination criterion is not met, returning to step (f)(ii)(3).

22. The method of claim 21, wherein the early termination criterion is that a distortion value of said best motion vector is less than the given distortion metric.

23. The method of claim 21, wherein the step of testing a plurality of positions and conditions further comprises testing two additional positions if either said best motion vector or said second best motion vector matches the center position, as determined using a logical OR operator.

24. The method of claim 23, wherein said two additional locations to be tested are adjacent to either said best motion vector if said best motion vector does not match the center position, or to said second best motion vector if said best motion vector does match the center position.

25. The method of claim 21, wherein the step of testing a plurality of positions and conditions further comprises testing one additional position if neither of said best motion vector or said second best motion vector matches the center position, and if said best motion vector and said second best motion vector are adjacent to each other.

26. The method of claim 25, wherein said one additional location to be tested is between said best motion vector and said second best motion vector.

27. The method of claim 21, wherein the step of testing a plurality of positions and conditions further comprises testing all remaining positions at the examination resolution if said best motion vector and said second best motion vector are in opposite directions.

28. The method of claim 21, wherein the given distortion metric used is chosen from the group: Sum of Absolute Differences (SAD), Sum of Absolute Value of Transformed Differences (SATD), and Mean Squared Error (MSE) or its equivalent Sum of Squared Differences (SSD).

* * * * *